(12) United States Patent
Komatsu et al.

(10) Patent No.: US 6,677,058 B1
(45) Date of Patent: Jan. 13, 2004

(54) HOT-DIP ZN PLATED STEEL SHEET EXCELLENT IN LUSTER-RETAINING PROPERTY AND METHOD OF PRODUCING THE SAME

(75) Inventors: Atsushi Komatsu, Osaka (JP); Takao Tsujimura, Tokyo (JP); Atsushi Andoh, Osaka (JP)

(73) Assignee: Nisshin Steel Co., Ltd., Tokyo (JP)

( * ) Notice: Subject to any disclaimer, the term of this patent is extended or adjusted under 35 U.S.C. 154(b) by 0 days.

(21) Appl. No.: 10/207,884

(22) Filed: Jul. 31, 2002

(51) Int. Cl.$^7$ .............................. B32B 15/18; B05D 3/00
(52) U.S. Cl. .................... 428/659; 427/337; 427/398.1; 427/398.3; 427/433; 427/434.2; 427/436; 428/687; 428/939
(58) Field of Search ................................ 428/659, 687, 428/939; 427/337, 398.1, 398.3, 433, 434.2, 436

(56) References Cited

U.S. PATENT DOCUMENTS

| | | | |
|---|---|---|---|
| 6,235,410 B1 | 5/2001 | Komatsu et al. | 428/659 |
| 6,379,820 B1 | 4/2002 | Komatsu et al. | 428/659 |

FOREIGN PATENT DOCUMENTS

| | | |
|---|---|---|
| JP | 10-226865 | 8/1998 |
| JP | 10-306357 | 11/1998 |

*Primary Examiner*—Robert R. Koehler
(74) *Attorney, Agent, or Firm*—McDermott, Will & Emery

(57) ABSTRACT

Degradation of the surface luster of a hot-dip Zn—Al—Mg plated steel sheet is inhibited by controlling the contact temperature between the plating layer and a water stream in a water cooling step after plating layer solidification, thereby suitably controlling the strip temperature during contact with the water stream, and further by incorporating a small amount of a suitable readily oxidizing element in the plating bath to stabilize the oxidation state of the plating surface layer Al and Mg.

11 Claims, 1 Drawing Sheet

HOT-DIP ZN PLATED STEEL SHEET EXCELLENT IN LUSTER-RETAINING PROPERTY AND METHOD OF PRODUCING THE SAME

TECHNICAL FIELD

This invention relates to a technology for preventing surface luster degradation that sometimes occurs during production of hot-dip Zn—Al—Mg plated steel sheet using a continuous hot-dip plating line.

BACKGROUND ART

JPA. 10-226865, JPA. 10-306357, U.S. Pat. No. 6,235,410 (U.S. Pat. No. 6,235,410 B1) and U.S. Pat. No. 6,379,820 (U.S. Pat. No. 6,379,820 B1) owned by the applicant of this application teach that a plated steel sheet having corrosion resistance and surface appearance sufficient to meet the requirements of an industrial product can be obtained manufacturing a hot dip Zn-base plated steel sheet using a hot-dip Zn—Al—Mg-system bath composed of Al: 4.0–10%, Mg: 1.0–4.0%, Ti: 0.002–0.1%, B: 0.001–0.045% and the balance of Zn and unavoidable impurities, and imparting to the plating layer a metallic structure including [primary crystal Al phase] and [Zn single phase] in a matrix of [Al/Zn/$Zn_2Mg$ ternary eutectic crystal structure]. The production conditions for obtaining this metallic structure are set out in the published specifications.

In the course of working with such a relatively high Al- and Mg-content hot dip Z-base plated steel sheet in ensuing production processes, the inventors discovered that, depending on the production conditions, the surface luster of the plating layer deteriorated within two to three days. This surface luster degradation of the plating layer discolors the aesthetically pleasing plated surface just after plating to a somewhat blackish interference color with passage of time (as quickly as 2–3 days but sometimes taking 4–7 days). The degree of outermost surface layer discoloration (a kind of blackening) can be quantified by measuring the surface brightness. For example, a plating surface that exhibited a brightness (L value) of around L=82 just after manufacture degrades to around L=72 in 7 days. Although this decline in L value does not degrade the corrosion resistance property of the product and does not impair the physical and chemical qualities of the plated steel sheet, it is undesirable from the point of surface appearance. The fact that the surface luster degradation is not uniform over the plating surface, but takes the form of splotchy discoloration, particularly detracts from the aesthetic appeal.

This degradation of surface luster can be considered to be peculiar to plated steel sheets having relatively high Al and Mg content like the hot-dip Zn—Al—Mg plated steel sheets mentioned above. The degree of oxidation of Mg concentrated in the outermost surface layer of the plating and the oxidized state of the surface layer Al are most likely complexly involved as causes of the degradation. No reports have been published to date regarding the mechanism of the surface luster degradation occurring in such a hot-dip Zn—Al—Mg plated steel sheet or regarding a method for inhibiting the degradation.

OBJECT OF THE INVENTION

An object of the present invention is therefore to provide means for inhibiting the degradation of surface luster that appears as a problem peculiar to hot-dip Zn—Al—Mg plated steel sheet.

DISCLOSURE OF THE INVENTION

The inventors carried out extensive experimentation and research directed to overcoming the foregoing problem. As a result, we determined that the degradation of the surface luster of hot-dip plated steel sheet is caused by the reaction behavior between the plating layer surface and water during water cooling in the cooling step following plating, that one way to prevent the surface luster degradation is to "control the contact temperature between the plating layer and the water stream" in the water cooling step after plating layer solidification, that, by extension, it is effective to suitably control the "strip temperature during contact with the water stream," and that it is also effective to stabilize the oxidation state of plating surface layer Al and Mg by incorporating a small amount of a suitable "readily oxidizing element" in the plating bath. By "strip temperature during contact with the water stream" is meant the strip temperature at the time cooling is conducted while forming a water film on the plating layer surface in the cooling step after completion of plating layer solidification. Specifically, it is the plating layer temperature when a water stream is passed onto the completely solidified plating layer and the plating layer is being cooled with a water film formed on the surface of the plating layer.

In other words, according to the inventors' findings, when steel strip is continuously immersed in and withdrawn from a hot-dip Zn—Al—Mg-system bath of the foregoing description and the steel strip is thereafter continuously passed through a water quenching zone that effects cooling while bringing the completely solidified plating layer surface into contact with a water stream (while providing onto the plating layer surface an amount of water enabling momentary formation of a water film on the plating layer surface), the aforesaid degradation of plating layer surface luster can be inhibited by controlling the strip temperature on the water quenching zone entry side to lower than 105° C.

The strip temperature on the water quenching zone entry side, while depending on the equipment conditions, depends strongly on the sheet thickness. When the strip thickness is great, controlling the strip temperature on the water quenching zone entry side to lower than 105° C. may not be easy. It was found that in such a case, similar inhibition of surface luster degradation can be achieved without lowering the strip temperature on the water quenching zone entry side to lower than 105° C. (i.e., with the temperature at 105° C. or higher) by adding to the plating bath a small amount of an element that has a very powerful affinity for oxygen (that is a readily oxidizing element) and that has a stabilizing effect on Al oxides. Such elements include, for example, the rare earth elements, Y, Zr and Si. In actual practice, it suffices to add about 0.002–0.05 mass % of the readily oxidizing element.

Thus, the present invention provides a method of producing a hot-dip Zn plated steel sheet excellent in luster-retaining property comprising a step of continuously immersing and withdrawing steel strip into/from a hot-dip Zn base bath containing Al: 4.0–15 mass % and Mg: 1.0–4.0 mass %, thereby forming a plating layer thereon, and a step of thereafter continuously passing the steel strip through a water quenching zone that effects cooling while bringing the completely solidified plating layer surface into contact with a water stream, degradation of the plating layer luster being inhibited at this time by controlling strip temperature on the water quenching zone entry side to lower than 105° C. The hot-dip Zn base bath is preferably composed of, in mass %, Al: 4.0–15%, Mg: 1.0–4.0%, Ti: 0.001–0.1%, B: 0.001–0.045% and the balance of Zn and unavoidable impurities.

The present invention further provides a method of producing a hot-dip Zn plated steel sheet excellent in luster-retaining property comprising a step of continuously immersing and withdrawing steel strip into/from a hot-dip Zn base bath containing Al: 4.0–15 mass % and Mg: 1.0–4.0 mass % and added with 0.002–0.05 mass % of at least one readily oxidizing element selected from among rare earth elements, Y, Zr and Si, thereby forming a plating layer thereon, and a step of thereafter continuously passing the steel strip through a water quenching zone that effects cooling while bringing the completely solidified plating layer surface into contact with a water stream, degradation of the plating layer surface luster being inhibited at this time by controlling strip temperature on the water quenching zone entry side to not lower than 105° C. and not higher than 300° C. The hot-dip Zn base bath is preferably composed of, in mass %, Al: 4.0–15%, Mg: 1.0–4.0%, Ti: 0.001–0.1%, B: 0.001–0.045%, at least one readily oxidizing element selected from among rare earth elements, Y, Zr and Si: 0.002–0.05%, and the balance of Zn and unavoidable impurities.

The present invention further provides, as a hot-dip Zn plated steel sheet obtained the foregoing methods, a hot-dip Zn plated steel sheet excellent in luster-retaining property obtained by hot-dip plating a steel strip using a hot-dip plating bath comprising, in mass %, Al: 4.0–15% and Mg: 1.0–4.0%, optionally, Ti: 0.001–0.1% and

B: 0.001–0.045%, preferably, at least one readily oxidizing element selected from among rare earth elements, Y, Zr and Si: 0.002–0.05%, and the balance of Zn and unavoidable impurities, thereby forming a plating layer thereon. The plating layer has a metallic structure including [primary crystal Al phase] in a matrix of [Al/Zn/$Zn_2$Mg ternary eutectic crystal structure] or [primary crystal Al phase], [Zn phase] and/or [$Zn_2$Mg phase] in a matrix of [Al/Zn/$Zn_2$Mg ternary eutectic crystal structure].

PREFERRED EMBODIMENTS OF THE INVENTION

Figure 1:
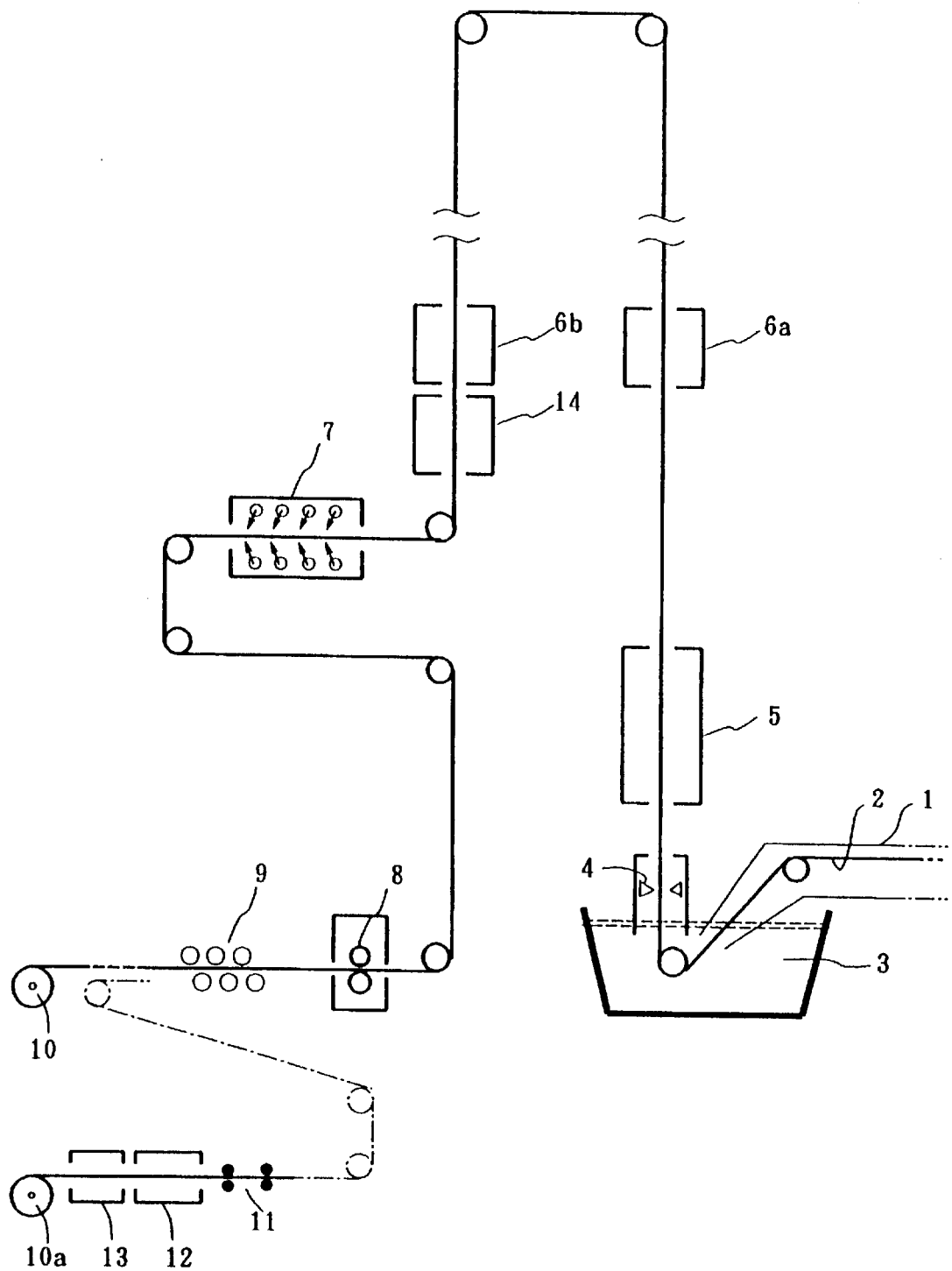
FIG. 1 is a line diagram schematically illustrating a facility for producing Mg-containing hot-dip Zn plated steel sheet according to the present invention.

Generally in this specification, the term "steel strip" is used when explaining the hot-dip plating line and the term "steel sheet" is used when explaining the product. However, the steel strip and steel sheet have the same characteristics.

FIG. 1 schematically illustrates a facility used to produce a hot dip Zn-base plated steel sheet. A steel strip 2 passed through a furnace 1 to be maintained at a prescribed temperature is continuously fed into a plating bath 3. Upon exiting the plating bath 3, the steel strip passes through a wiping nozzle 4 that regulates its coating weight and then through an air-jet cooler 5. The plating layer is completely solidified during passage through the air-jet cooler 5. The strip next passes through air-water cooling zones 6a, 6b and an air cooling zone 14, any of which may be operated alone or in combination with the others, or not be operated, and then through a water quenching zone 7. It is then temper-rolled in a skin pass mill 8, passed through a tension leveller 9, passed through an inspection step and taken up on a tension reel 10. When chromating or other such chemical treatment is conducted, the steel strip exiting the tension lever 9 is treated in a roll coater 11, passed through a drying zone 12 and an air cooling zone 13, and taken up on a tension reel 10a.

As explained earlier, when producing a hot-dip Zn—Al—Mg plated steel sheet containing relatively large amounts of Al and Mg (hereinafter called "Mg-containing hot-dip Zn plated steel sheet"), appropriate control of the cooling rate up to complete plating layer solidification and of the solidification completion position is essential from the aspect of surface property. For this, the strip feeding speed must be strictly controlled and the strip temperature at the time of passage through the air-jet cooler 5 needs to be exactly controlled in accordance with the sheet thickness. Next, so as to enable suitable temper rolling at the skin pass mill 8, the strip temperature at the skin pass entry side needs to be adjusted to a prescribed level (e.g., not more than 70° C.) by cooling conducted at the air-water cooling zones 6 (and the air cooling zone 14) and/or the water quenching zone 7. The cooling load at these cooling zones varies with the strip running speed and the sheet thickness. Generally, water or a water solution is sprayed at the air-water cooling zones, air is jetted at the air-jet cooling zone, and, at the water quenching zone, a water stream adequate for momentarily forming a water film on the plating layer surface is supplied. Compared with the first mentioned cooling stages, the latter mentioned water quenching zone can achieve a faster cooling rate owing to the contact of the water stream with the plating layer surface. Efficient cooling operation can therefore be conducted at the water quenching zone irrespective of variation in cooling load. Although water or a water solution is sprayed together with an air stream at the air-water cooling zones, not enough water is supplied to form a water film on the plating layer surface. The cooling is therefore chiefly the result of latent heat extraction by evaporation. This is a different form of heat removal from that by contact with a water stream as in the water quenching zone and therefore differs in cooling rate.

It was found that the luster-retaining property of the plating surface differs depending on strip temperature on the water quenching zone entry side. When the temperature is 105° C. or higher, surface luster degradation readily occurs. While the reason for this is not certain, the inventors concluded that the causes involve such factors as that the reactivity of the plating layer surface is enhanced by the occurrence of a kind of boiling phenomenon when the strip temperature is 100° C. or higher upon entering the water quenching zone and that the behavior of Al under atmospheric pressure in the presence of water differs above and below about 110° C., i.e., $Al_2O_3.H_2O$ (or AlOOH) compound is stable above this temperature while $Al_2O_3.H_2O$ (or $Al(OH)_3$) compound is stable below this temperature, so that the Al compound formed on the plating layer surface in the water quenching zone differs depending on the entry side steel strip temperature.

In an Mg-containing hot-dip Zn plated steel sheet of the foregoing type having a metallic structure including [primary crystal Al phase], [Zn phase] and/or [$Zn_2$Mg phase] in a matrix of [Al/Zn/$Zn_2$Mg ternary eutectic crystal structure], the outermost surface of the ternary eutectic crystal structure is changed into a readily oxidizing form by the aforesaid chemical reaction and this is believed to be why surface luster degradation that produces a change in brightness occurs within two or three days after plating.

At any rate, the inventors discovered that, as demonstrated by the Examples set out later, the surface luster degradation of an Mg-containing hot-dip Zn plated steel sheet can be substantially prevented by regulating the temperature of the steel strip entering the water quenching zone to lower than 105° C. In this case, the cooling operation before entry into to the water quenching zone needs to be conducted not by supplying enough water to the completely solidified plating surface to form a water film that produces quenching, as is done in the water quenching zone, but by a mild cooling operation such as by air-water cooling (mist spraying) or air cooling (e.g. air-jet cooling). This is because regulation of the steel strip temperature entering the water quenching zone to lower than 105° C. would be meaningless if a quenching operation that forms a water film as is done in the water quenching zone should be conducted before the steel strip enters the water quenching zone. Depending on the sheet thickness and the strip running speed, the strip temperature on the water quenching zone entry side can be regulated to lower than 105° C. even by air-water cooling.

When the sheet thickness is large, however, it may sometimes be impossible to regulate the strip temperature on the water quenching zone entry side to lower than 105° C. Although a sufficient amount of cooling in the air-water cooling regions can be achieved even when sheet thickness is large by reducing the strip running speed, this is inadvisable because it leads to problems in solidification point control and lowers productivity. Even when the strip temperature on the water quenching zone entry side is 105° C. or higher, however, surface luster degradation can be effectively inhibited, as is demonstrated by the Examples set out later, by making present at the just completely solidified plating surface an appropriate amount of a readily oxidizing element that has a very powerful affinity for oxygen and a stabilizing effect on Al oxides, such as a rare earth element, Y, Zr or Si. In actual practice, it suffices to add about 0.002–0.05 mass % of the readily oxidizing element. Although other elements that exhibit an effect similar to the rare earth elements, Y, Zr and Si may exist, none has yet been identified.

These readily oxidizing elements have a property of concentrating at the outermost surface layer portion of the plating layer during the solidification process of the plating layer of the Mg-containing hot-dip Zn plated steel sheet, or even after solidification. These elements can therefore reach a relatively high concentration at the outermost surface layer portion even when added to the plating bath in only a small amount. This is thought to enable them to inhibit surface reactions in the water quenching zone which adversely affect the surface luster-maintaining property. When these readily oxidizing elements are added to the plating bath at less than 0.002%, however, they do not manifest the inhibiting effect. They must therefore be added so as to make their content in the plating bath composition not less than 0.002 mass %. On the other hand, amounts added in excess have poor solubility in the plating bath and even if dissolved only saturate the surface luster degradation inhibiting effect because the elements simply precipitate in excess near the grain boundaries in the plating surface layer portion. The amount added is therefore such that the content in the plating bath becomes not more than 0.10 mass %, in some cases not more than 0.08 mass %, preferably 0.05 mass %, more preferably 0.03 mass %.

The surface luster degradation preventing effect produced by addition of one or more readily oxidizing elements is acts most effectively when, as explained in the foregoing, the strip temperature on the water quenching zone entry side is 105° C. or higher. Even when the strip temperature on the water quenching zone entry side is lower than 105° C., however, one or more readily oxidizing elements can be added to the plating bath to stay on the safe side.

In the case where the strip temperature on the water quenching zone entry side is 105° C. or higher, it should preferably be controlled to not higher than 300° C. because at higher than 300° C. the cooling load in the water quenching zone becomes so large as to prevent sufficient lowering of the temperature on the skin pass entry side.

In an ordinary production line, if the strip thickness is less than 1.6 mm, the strip temperature on the water quenching zone entry side can be relatively easily made lower than 105° C. so as to ensure good luster-retaining property. When the strip thickness is 1.6 mm or greater, it is, from the aspect of actual operation, better to ensure luster-retaining property by addition of a readily oxidizing element than by forcibly cooling the steel strip so as to have a temperature on the water quenching zone entry side of lower than 105° C.

The present invention offers a breakthrough in prevention of surface luster degradation in Mg-containing hot-dip Zn plated steel sheets and is therefore used with Mg-containing hot-dip Zn plated steel sheets that experience surface luster degradation. Such an Mg-containing hot-dip Zn plated steel sheet is typically a hot-dip Zn—Al—Mg plated steel sheet exhibiting excellent corrosion resistance and surface appearance obtained by using a hot-dip Zn base bath composed of Al: 4.0–15% and Mg: 1.0–4.0% as basic components, plus Ti: 0.001–0.1% and B: 0.001–0.045%, and the balance of Zn and unavoidable impurities, and imparting the plating layer with a metallic structure including [primary crystal Al phase] in a matrix of [Al/Zn/$Zn_2Mg$ ternary eutectic crystal structure] or [primary crystal Al phase], [Zn phase] and/or [$Zn_2Mg$ phase] in a matrix of [Al/Zn/$Zn_2Mg$ ternary eutectic crystal structure]. The metallic structure including [primary crystal Al phase] in a matrix of [Al/Zn/$Zn_2Mg$ ternary eutectic crystal structure] is preferably one in which the total amount of [Al/Zn/$Zn_2Mg$ ternary eutectic crystal structure]+ [primary crystal Al phase] accounts for not less than 80 vol. % of the metallic structure, more preferably for not less than 95 vol. % thereof. The balance can consist of [Zn phase] and [$Zn_2Mg$ phase], plus, in some cases, small amounts of [Zn/$Zn_2Mg$ binary eutectic crystal] and/or [Al/$Zn_2Mg$ binary eutectic crystal]. When Si is added, small amounts of [Si phase], [$Mg_2Si$ phase], [Al/$Mg_2Si$ binary eutectic crystal] and the like may also be present.

The present invention thus provides a hot-dip Zn plated steel sheet excellent in luster-retaining property obtained by hot-dip plating a steel strip using a hot-dip plating bath comprising, in mass %, Al: 4.0–15%, Al: 4.0–15%, Mg: 1.0–4.0%, Ti: 0.001–0.1%

B: 0.001–0.045%, at least one readily oxidizing element selected from among rare earth elements, Y, Zr and Si: 0.002–0.05%, and the balance of Zn and unavoidable impurities, thereby forming a plating layer thereon. The plating layer has a metallic structure including [primary crystal Al phase] in a matrix of [Al/Zn/$Zn_2Mg$ ternary eutectic crystal structure] or [primary crystal Al phase], [Zn phase] and/or [$Zn_2Mg$ phase] in a matrix of [Al/Zn/$Zn_2Mg$ ternary eutectic crystal structure]. It has a structural characteristic in the point that the one or more readily oxidizing elements are concentrated in the outermost surface layer portion of the plating layer.

The addition amounts, actions and effects of the Al, Mg, Ti, B etc. making up the plating bath remain the same in the plating bath added with at least one readily oxidizing element in accordance with the present invention. Addition of Ti and B is beneficial because these elements act to inhibit generation and growth of $Zn_{11}Mg_2$ phase that has and adverse effect on appearance and corrosion resistance when the plating layer is given the aforesaid metallic structure including a $Zn_2Mg$ ternary eutectic crystal structure. To obtain this effect by adding Ti, B, or Ti—B alloy or compound to the bath, it suffices to make the addition so that the content in the bath becomes Ti: 0.001–0.1% and B: 0.001–0.045%. At higher contents than these, precipitates grow in the plating layer to produce "bumps" (called as "butsu" in Japanese language) in the plating layer that detract from the surface appearance.

Al present in the plating layer improves the corrosion resistance of the plated steel sheet and operates to inhibit dross generation during plated steel sheet production. When the Al content is less than 1.0 mass %, the corrosion resistance improving effect is insufficient and the effect of inhibiting generation of Mg oxide system dross is also low. The Al content is preferably made not less than 4.0 mass %. On the other hand, when the Al content exceeds 15 mass %, pronounced growth of an Fe—Al alloy layer at the interface between the plating layer and the base steel sheet degrades plating adherence. The Al content is preferably 4.5–13.0 mass %, more preferably 5.0–10.0 mass %, and most preferably 5.0–7.0 mass %.

Mg present in the plating layer generates a uniform corrosion product on the plating layer surface and, by this, operates to markedly enhance the corrosion resistance of the plated steel sheet. When the Mg content is less than 1.0%, this action of uniformly generating such a corrosion product is insufficient. On the other hand, when the Mg content exceeds 4.0%, the corrosion resistance improvement effect by Mg saturates and generation of undesirable Mg oxide system dross occurs more readily. The Mg content is therefore defined as 1.0–4.0 mass%. The Mg content is preferably 1.5–4.0 mass %, more preferably 2.0–3.5 mass %, most preferably 2.5–3.5 mass %.

It was found that the aforesaid surface luster degradation problem also occurs when chemical treatment is applied at the final stage of the Mg-containing hot-dip Zn plated steel sheet production line such as by using the roll coater 11 shown at the bottom of FIG. 1, irrespective of whether a chromate coating, a chromate-free conversion coating, an organic resin film containing chromium acid, or a silicate film containing chromium acid or other such film is formed. Depending on the production conditions, the phenomenon of a decline in brightness and surface luster degradation after a few days also occurs (or does not occur) in a plated product having a film produced by chemical treatment, just as it does (or does not) when chemical treatment is not conducted. It was found that this problem can be similarly overcome by controlling the aforesaid strip temperature on the water quenching zone entry side and adding at least one readily oxidizing element to the plating bath in accordance with the present invention.

More specifically, also in the case where the steel strip is passed through a chemical treatment zone after being passed through the water quenching zone, the surface luster degradation of the chemically treated Mg-containing hot-dip Zn plated steel sheet can be inhibited by, as in the foregoing method of producing an Mg-containing hot-dip Zn plated steel sheet, controlling the strip temperature on the water quenching zone entry side to lower than 105° C. or adding 0.002–0.05 mass % of a readily oxidizing element to the plating bath.

The present invention thus provides a hot-dip Zn plated steel sheet excellent in luster-retaining property obtained by hot-dip plating a steel strip using a hot-dip plating bath comprising, in mass %, Al: 4.0–15%, Mg: 1.0–4.0%, Ti: 0.001–0.1%

B: 0.001–0.045%, at least one readily oxidizing element selected from among rare earth elements, Y, Zr and Si: 0.002–0.05%, and the balance of Zn and unavoidable impurities, thereby forming a plating layer thereon, and chemically treating the plating layer.

EXAMPLES

Example 1

A hot-dip Zn base bath containing about 6 mass % of Al, about 3 mass % of Mg, about 0.05 mass % of Ti and about 0.01 mass % of B in zinc was constituted in a facility like that shown in FIG. 1 and an Mg-containing hot-dip Zn plated steel sheets (thickness: 0.8–1.0 mm) were manufactured to have a plating layer with a metallic structure including of [primary crystal Al phase], [Zn phase] and [Zn2Mg phase] in a matrix of [Al/Zn/Zn$_2$Mg ternary eutectic crystal structure]. At this time, the strip temperature on the outlet side of the air-jet cooler 5 was made 335° C. or lower so as to complete solidification of the plating layer in the cooler, the cooling conditions and strip running speed were made substantially constant in the air-water cooling zones 6a, 6b, the air cooling zone 14 and the water quenching zone 7, the strip temperature on the water quenching zone 7 entry side was made 100° C. or lower, and the steel strip was passed through the skin pass mill at about 70° C. or lower. The surface luster of the Mg-containing hot-dip Zn plated steel sheet obtained was excellent and no phenomenon causing degradation thereof was observed.

Steel strips of 1.6 mm or greater thickness were passed under substantially the same conditions as those set out above. Although strip temperature on the water quenching zone 7 entry side rose to around 120–150° C., the operation itself was trouble free and Mg-containing hot-dip Zn plated steel sheets having the same excellent surface luster were produced. After two or three days, however, the surface luster of these steel sheets declined slightly, with the brightness L value of some being observed to decrease from 82 just after manufacture to around 75 two days later. The cooling capacity of the air-water cooling zones 6a, 6b was then increased to drop the strip temperature on the water quenching zone 7 entry side to lower than 105° C. As a result, the surface luster degrading phenomenon was no longer observed.

Also when chromating treatment was conducted, whether or not surface luster degradation occurred again depended on the strip temperature on the water quenching zone 7 entry side. From this it was learned that surface degradation occurs when chromating treatment is conducted in the same way as when it is not.

Example 2

Building on the experience acquired in the preceding Example, the degree of plating layer surface luster degradation was investigated by conducting tests under various conditions. The surface luster was assessed as the brightness (L) measured as the Lab method L value using a spectrophotometer.

First, during production of hot-dip Zn—Al—Mg plated steel sheets under the "Plating conditions" set out below, air-water cooling (mist spraying) and water quenching (water stream projection) were conducted under the "Cool ing conditions" set out below from the strip temperature at completion of plating layer solidification to about 30° C. The degrees of surface luster degradation of test pieces taken from the obtained plated steel sheets were evaluated by measuring their L values once just after plating and again after a constant temperature and humidity test in which the plating layer of each plated steel sheet. The plating layer of every steel sheet had a metallic structure including [primary crystal Al phase] in a matrix of [Al/Zn/$Zn_2$Mg ternary eutectic crystal structure], sometimes further including [Zn phase] and [$Zn_2$Mg phase] (hereinafter called "$Zn_2$Mg-system" metallic structure).

TABLE 1

Plating bath composition: Al = 9.0 mass %, Mg = 2.3 mass %, Balance: Zn

| | Cooling conditions | | | | | | | Surface luster | | |
|---|---|---|---|---|---|---|---|---|---|---|
| | Air-water cooling | | | | Water quenching | | | | | |
| No. | Mist water flow $m^3/h$ | Mist airflow $m^3/min$ | Strip temp- erature at start of mist spraying °C. | Strip temp- erature at end of mist spraying °C. | Water flow $m^3/h$ | Strip temperature at start of water stream projection °C. | Strip temperature at end of water stream projection °C. | L value just after plating | L value after 20 h constant temperature and humidity test | Example type |
| A-1 | 10 | 1000 | 198 | 131 | 150 | 92 | 30 | 82 | 82 | Invention |
| A-2 | 10 | 1000 | 280 | 207 | 150 | 101 | 30 | 82 | 81 | Invention |
| A-3 | 8 | 600 | 280 | 223 | 150 | 112 | 30 | 82 | 74 | Comparative |
| A-4 | 4 | 600 | 280 | 245 | 150 | 132 | 31 | 81 | 70 | Comparative | test pieces were held in a thermobygrostat maintained at a temperature of 60° C. and a relative humidity of 90% for 20 hours starting from just after plating.

Plating Conditions

Processed steel strip: Hot-rolled steel strip of 2.0 mm thickness

Plating bath composition: Al=9.0 mass %, Mg=2.3 mass %, Balance=Zn

Plating bath temperature: 430° C.

Coating weight: 90 g/$m^2$

Strip running speed: 80 m/min

Cooling Conditions (1) Air-water cooling
   Nozzle: Two-fluid nozzle
   Fluids: Water (pressure=12.5 kPa)+Air (pressure=4.0 kPa)
   Mist water flow: As shown in Table 1
   Mist airflow: As shown in Table 1
   Average mist particle diameter: About 50 μm
   Strip temperature at start of mist spraying: As shown in Table 1
   Strip temperature at end of mist spraying: As shown in Table 1

(2) Water quenching
   Water stream projector: 7 header rows each consisting of 10 flat spray nozzles spaced at 150 mm intervals in the direction of strip width
   Fluid: Water (pressure=2.5 kgf/$cm^2$)
   Water flow: As shown in Table 1
   Strip temperature at start of water stream projection: As shown in Table 1
   Strip temperature at end of water stream projection: As shown in Table 1

The L values of plated steel sheets obtained under the foregoing conditions at different strip temperatures at start of stream projection (strip temperature on the water quenching entry side) measured just after plating and after the 20-hour constant temperature and humidity test are shown in Table 1. The metallic structures of the plating layers were examined by microscopically observing a cross-section of the As can be seen from the results in Table 1, when the strip temperature on the water quenching entry side was higher than 105° C., the tendency for the brightness L value to decrease became stronger as the temperature increased. In contrast, when the temperature was lower than 105° C., the brightness just after plating was retained without change over the course of time, demonstrating that Mg-containing hot-dip Zn plated steel sheets exhibiting excellent luster-retaining property were obtained.

Example 3

Mg-containing hot-dip Zn plated steel sheets produced under the following conditions using the same cooling conditions after plating layer solidification as in Example 2 were examined for state of surface luster degradation. The results are shown in Table 2.

Plating Conditions

Processed steel strip: Hot-rolled steel strip of 3.2 mm thickness

Plating bath composition: Al=6.3 mass %, Mg=3.2 mass %, Ti=0.008 mass %, B=0.002 mass %, Balance=Zn Plating bath temperature: 390° C.

Coating weight: 120 g/$m^2$

Strip running speed: Varied as shown in Table 2

Cooling Conditions (1) Gas cooling (Cooling with air-jet cooler only)
   Nozzle: Plate-like nozzle with slit of 5 mm width
   Gas: Air (pressure=4 kPa)
   Airflow: As shown in Table 2
   Strip temperature at start of air cooling: As shown in Table 2
   Strip temperature at end of air cooling: As shown in Table 2

(2) Water quenching
   Water stream projector: 7 header rows each consisting of 10 flat spray nozzles spaced at 150 mm intervals in the direction of strip width
   Fluid: Water (pressure=2.2 kgf/$cm^2$)
   Water flow: As shown in Table 2
   Strip temperature at start of water stream projection: As shown in Table 2
   Strip temperature at end of water stream projection: As shown in Table 2

TABLE 2

Plating bath composition: Al = 6.3 mass %, Mg = 3.2 mass %, Ti: 0.008 mass %, B = 0.002 mass %, Balance: Zn

| | | | Cooling conditions | | | | | Surface luster | | |
|---|---|---|---|---|---|---|---|---|---|---|
| | | | Air cooling | | | Water quenching | | | | |
| No. | Strip running speed m/min | Airflow $m^3$/min | Strip temperature at start of cooling ° C. | Strip temperature at end of cooling ° C. | Water flow $m^3$/h | Strip temperature at start of water stream projection ° C. | Strip temperature at end of water stream projection ° C. | L value just after plating | L value after 20-h constant temperature and humidity test | Example type |
| B-1 | 23 | 0 | — | — | 120 | 82 | 30 | 81 | 81 | Invention |
| B-2 | 31 | 2500 | 167 | 126 | 120 | 82 | 30 | 81 | 81 | Invention |
| B-3 | 40 | 2500 | 185 | 140 | 120 | 102 | 30 | 81 | 80 | Invention |
| B-4 | 40 | 1200 | 185 | 158 | 120 | 118 | 30 | 81 | 73 | Comparative |
| B-5 | 56 | 2500 | 212 | 164 | 120 | 131 | 31 | 81 | 71 | Comparative |

As can be seen from the results in Table 2, in this Example as in Example 2, when the strip temperature on the water quenching entry side was higher than 105° C., the tendency for the brightness L value to decrease became stronger as the temperature increased, but when the temperature was; lower than 105° C., the brightness just after plating remained the same even after the 20-hour constant temperature and humidity test. The metallic structures of the plating layers were examined by microscopically observing a cross-section of the plating layer of each plated steel sheet. A "$Zn_2Mg$-system" metallic structure was consistently obtained in every steel sheet.

Example 4

Nos. B-2 to B-5 of Example 3 were subjected to chemical treatment of their water-quenched plating surfaces under the conditions set out below. Their brightnesses just after chemical treatment and after a 20-hour constant temperature and humidity test were measured by the method of Example 2. The results are shown in Table 3.

Chemical Treatment Conditions A
  Application method: Spray and wringer roll method
  Processing solution: Zinchrome 3387N from Nihon Parkerizing Co., Ltd. (solution total chromium concentration: 10 g/L)
  Chromium coating weight: 10 mg/$m^2$ Chemical Treatment Conditions B
  Application method: Roll coating method
  Processing solution: Zinchrome 3387N added with 1 g/L of zirconium fluoride (solution total chromium concentration: 20 g/L)
  Chromium coating weight: 40 mg/$m^2$ Chemical Treatment Conditions C
  Application method: Roll coating method
  Processing solution: Aqueous solution composed mainly of 50 g/L of magnesium phosphate, 10 g/L of potassium fluorotitanate and 3 g/L of organic acid
  Metallic component coating weight: 50 mg/$m^2$ Chemical Treatment Conditions D
  Coating formed by the following two-step processing Bottom Layer
  Application method: Shower and wringer roll method
  Processing solution: Zinchrome 3387N (solution total chromium concentration: 10 g/L)
  Chromium coating weight: 10 mg/$m^2$ Top Layer
  Application method: Roll coating method
  Organic coating: Urethane resin (thickness: 1.5 μm)

TABLE 3

| | | Surface luster | | |
|---|---|---|---|---|
| Chemically treated plating layer | Chemical treatment conditions | L value just after chemical treatment | L value after 20-h constant temperature and humidity test | Example Type |
| No. B-2 | A | 81 | 81 | Invention |
| No. B-4 | A | 81 | 72 | Comparative |
| No. B-3 | B | 81 | 80 | Invention |
| No. B-5 | B | 81 | 70 | Comparative |
| No. B-3 | C | 81 | 81 | Invention |
| No. B-4 | C | 81 | 73 | Comparative |
| No. B-2 | D | 81 | 81 | Invention |
| No. B-5 | D | 81 | 72 | Comparative |

As can be seen from the results in Table 3, when the strip temperature on the water quenching entry side was 105° C. or higher, the brightness value L decreased with passage of time irrespective of the chemical treatment applied. When the temperature was lower than 105° C., the brightness just after plating was retained without change.

Example 5

Plating was conducted under the following plating conditions and cooling conditions with one or more readily oxidizing elements added to the plating bath. Each plating was examined for surface luster degradation. The results are shown in Table 4.

Plating Conditions
  Processed steel strip: Hot-rolled steel strip of 1.6 mm thickness
  Plating bath composition: As shown in Table 4
  Plating bath temperature: 450° C.
  Coating weight: 190 g/$m^2$
  Strip running speed: 60–120 m/min Cooling Conditions
  (1) Air-water cooling
    Nozzle: Two-fluid nozzle
    Fluids: Water (pressure=1.0–3.5 kgf/$cm^2$)+Air (pressure=2.5–5.0 kgf/$cm^2$)
    Mist water flow: 0–8 $m^3$/h
    Mist airflow: 0–600 $m^3$/min
    Average mist particle diameter: 10–30 μm (2) Gas cooling
  Nozzle: Plate-like nozzle with slit of 5 mm width
  Gas: Air (pressure=4 kPa)
  Airflow: 0–3500 m³/m
(3) Water quenching
  Water stream projector: 7 header rows each consisting of 10 flat spray nozzles spaced at 150 mm intervals in the direction of strip width
  Fluid: Water (pressure=3.0 kgf/cm²)
  Water flow: 180 m³/h
  Strip temperature at start of water stream projection: As shown in Table 4

TABLE 4

| | Plating bath composition (mass %, balance Zn) | | | | | | Strip temperature on the water quenching entry side | Surface luster | | | |
|---|---|---|---|---|---|---|---|---|---|---|---|
| | | | | | Readily oxidizing element | | | Chemical | L value just after plating or chemical | L value after 20-h constant temperature | Example |
| No. | Al | Mg | Ti | B | Type | Content | ° C. | treatment | treatment | humidity test | type |
| C-1 | 13.8 | 2.2 | 0.046 | 0.020 | Y | 0.030 | 198 | No | 81 | 80 | Invention |
| C-2 | 8.2 | 2.9 | 0.012 | 0.005 | Y | 01009 | 96 | No | 82 | 82 | Invention |
| C-3 | 9.4 | 3.3 | 0.009 | 0.010 | La | 0.007 | 155 | No | 82 | 81 | Invention |
| | | | | | Ce | 0.010 | | | | | |
| C-4 | 4.5 | 1.3 | 0.037 | 0.038 | Zr | 0.028 | 237 | No | 81 | 80 | Invention |
| C-5 | 6.1 | 3.3 | 0.024 | 0.009 | Zr | 0.003 | 131 | No | 82 | 81 | Invention |
| C-6 | 10.3 | 3.7 | 0.005 | 0.006 | Zr | 0.029 | 103 | No | 82 | 82 | Invention |
| C-7 | 7.8 | 3.2 | 0.011 | 0.002 | Si | 0.041 | 138 | No | 82 | 82 | Invention |
| C-8 | 6.3 | 3.0 | 0.050 | 0.003 | Si | 0.023 | 100 | No | 82 | 82 | Invention |
| C-9 | 5.2 | 2.6 | 0.008 | 0.004 | Si | 0.004 | 83 | No | 82 | 82 | Invention |
| C-10 | 5.6 | 2.5 | 0.006 | 0.001 | Zr | 0.001 | 146 | No | 81 | 72 | Comparative |
| C-11 | 11.5 | 2.0 | 0.073 | 0.015 | La | 0.001 | 174 | No | 81 | 66 | Comparative |
| C-12 | 6.1 | 3.3 | 0.024 | 0.009 | Zr | 0.003 | 131 | Yes (Type B) | 82 | 81 | Invention |
| C-13 | 13.8 | 2.2 | 0.046 | 0.020 | Y | 0.030 | 198 | Yes (Type C) | 81 | 80 | Invention |
| C-14 | 6.3 | 3.0 | 0.050 | 0.003 | Si | 0.023 | 100 | Yes (Type C) | 82 | 82 | Invention |
| C-15 | 5.6 | 2.5 | 0.006 | 0.001 | Zr | 0.001 | 146 | Yes (Type B) | 81 | 73 | Comparative |
| C-16 | 4.4 | 1.8 | — | — | Zr | 0.021 | 109 | No | 82 | 82 | Invention |
| C-17 | 6.3 | 2.9 | — | — | Y | 0.005 | 145 | No | 82 | 82 | Invention |
| | | | | | Si | 0.012 | | | | | |
| C-18 | 5.7 | 3.2 | — | — | Si | 0.028 | 167 | Yes (Type B) | 81 | 81 | Invention |

As shown in FIG. 4, when plated steel sheets like those whose brightness values L fell to around 71 after the 20-hour constant temperature and humidity test in Examples 2 and 3 were produced in the same manner except for the addition of at least one readily oxidizing element to the plating bath, the decline in brightness L value was inhibited by the added readily oxidizing element. When the plating surface layer portion of the No. C-7 Mg-containing hot-dip Zn plated steel sheet added with Si was subjected to analysis of its elemental composition by ESCA, it was found that almost all of the Si was concentrated in the outermost surface layer portion of the plating and almost no Si was present in the interior of the plating layer. A comparison of the ESCA analysis results for a plated steel sheet whose brightness L value decreased during the 20-hour constant temperature and humidity test (No. C-10) with the results for a plated steel sheet whose brightness L value did not decrease (No. C-5) showed that Mg tended to be heavily present in the outermost surface layer portion of the plating layer of the former plated steel sheet.

Table 4 includes cases in which the water-quenched plating layer was chemically treated (No. C-12 to No. C-15). The degree of decline in brightness L value differs depending on whether or not a readily oxidizing element is added and it can be seen that a readily oxidizing element was added, decrease in brightness L value was inhibited.

As explained in the foregoing, the present invention can effectively prevent the phenomenon of surface luster degradation that is peculiar to Mg-containing hot-dip Zn plated steel sheets. It is therefore capable of providing Mg-containing hot-dip Zn plated steel sheet that is good in corrosion resistance and also excellent in luster-retaining property.

What is claimed is:

1. A method of producing a hot-dip Zn plated steel sheet excellent in luster-retaining property comprising:

a step of continuously immersing and withdrawing steel strip into/from a hot-dip Zn base bath containing Al: 4.0–15 mass % and Mg: 1.0–4.0 mass %, thereby forming a plating layer thereon; and a step of thereafter continuously passing the steel strip through a water quenching zone that effects cooling while bringing the completely solidified plating layer surface into contact with a water stream, wherein degradation of the plating layer luster being inhibited at this time by controlling strip temperature on the water quenching zone entry side to lower than 105° C.

2. A method of producing a hot-dip Zn plated steel sheet excellent in luster-retaining property comprising:

a step of continuously immersing and withdrawing steel strip into/from a hot-dip Zn base bath containing, in mass %,
  Al: 4.0–15%,
  Mg: 1.0–4.0%,
  Ti: 0.001–0.1%,
  B: 0.001–0.045%, and
  the balance of Zn and unavoidable impurities,
  thereby forming a plating layer thereon; and a step of thereafter continuously passing the steel strip through a water quenching zone that effects cooling while bringing the completely solidified plating layer surface into contact with a water stream, wherein degradation of the plating layer luster being inhibited at this time by controlling strip temperature on the water quenching zone entry side to lower than 105° C.

3. A method of producing a hot-dip Zn plated steel sheet excellent in luster-retaining property comprising:

a step of continuously immersing and withdrawing steel strip into/from a hot-dip Zn base bath containing Al: 4.0–15 mass % and Mg: 1.0–4.0 mass % and added with 0.002–0.05 mass % of at least one readily oxidizing element selected from among rare earth elements, Y, Zr and Si, thereby forming a plating layer thereon; and a step of thereafter continuously passing the steel strip through a water quenching zone that effects cooling while bringing the completely solidified plating layer surface into contact with a water stream, wherein degradation of the plating layer surface luster being inhibited at this time by controlling strip temperature on the water quenching zone entry side to not lower than 105° C.

4. A method of producing a hot-dip Zn plated steel sheet excellent in luster-retaining property comprising:

a step of continuously immersing and withdrawing steel strip into/from a hot-dip Zn base bath containing, in mass %, Al: 4.0–15%

Mg: 1.0–4.0%,

Ti: 0.001–0.1%,

B: 0.001–0.045%, at least one readily oxidizing element selected from among rare earth elements, Y, Zr and Si: 0.002–0.05%, and the balance of Zn and unavoidable impurities, thereby forming a plating layer thereon; and a step of thereafter continuously passing the steel strip through a water quenching zone that effects cooling while bringing the completely solidified plating layer surface into contact with a water stream, wherein degradation of the plating layer luster being inhibited at this time by controlling strip temperature on the water quenching zone entry side to not lower than 105° C. and not higher than higher than 300° C.

5. A method of producing a hot-dip Zn plated steel sheet excellent in luster-retaining property according to any of claims 1 to 4, further comprising a step of passing the steel strip passed through the water quenching zone through a chemical treatment zone.

6. A hot-dip Zn plated steel sheet excellent in luster-retaining property obtained by hot-dip plating a steel strip using a hot-dip plating bath comprising, in mass %, Al: 4.0–15%, Mg: 1.0–4.0%, at least one readily oxidizing element selected from among rare earth elements, Y, Zr and Si: 0.002–0.05%, and the balance of Zn and unavoidable impurities, thereby forming a plating layer thereon.

7. A hot-dip Zn plated steel sheet excellent in luster-retaining property obtained by hot-dip plating a steel strip using a hot-dip plating bath comprising, in mass %, Al: 4.0–15%, Mg: 1.0–4.0%, Ti: 0.001–0.1%

B: 0.001–0.045%, at least one readily oxidizing element selected from among rare earth elements, Y, Zr and Si: 0.002–0.05%, and the balance of Zn and unavoidable impurities, thereby forming a plating layer thereon.

8. A hot-dip Zn plated steel sheet excellent in luster-retaining property according to claim 6 or 7, wherein the readily oxidizing element is concentrated in the outermost surface layer portion of the plating layer.

9. A hot-dip Zn plated steel sheet excellent in luster-retaining property according to claim 6, 7 or 8, wherein the plating layer has a metallic structure including [primary crystal Al phase] in a matrix of [Al/Zn/$Zn_2$Mg ternary eutectic crystal structure] or [primary crystal Al phase], [Zn phase] and/or [$Zn_2$Mg phase] in a matrix of [Al/Zn/$Zn_2$Mg ternary eutectic crystal structure].

10. A hot-dip Zn plated steel sheet excellent in luster-retaining property obtained by hot-dip plating a steel strip using a hot-dip plating bath comprising, in mass %, Al: 4.0–15%, Mg: 1.0–4.0%, at least one readily oxidizing element selected from among rare earth elements, Y, Zr and Si: 0.002–0.05%, and the balance of Zn and unavoidable impurities, thereby forming a plating layer thereon, and chemically treating the plating layer.

11. A hot-dip Zn plated steel sheet excellent in luster-retaining property obtained by hot-dip plating a steel strip using a hot-dip plating bath comprising, in mass %, Al: 4.0–15%, Mg: 1.0–4.0%, Ti: 0.001–0.1%

B: 0.001–0.045%, at least one readily oxidizing element selected from among rare earth elements, Y, Zr and Si: 0.002–0.05%, and the balance of Zn and unavoidable impurities, thereby forming a plating layer thereon, and chemically treating the plating layer.

* * * * *